Dec. 17, 1957  E. E. HOSEA ET AL  2,816,454
POSITIONING MEANS FOR MACHINE TOOLS
Filed Dec. 14, 1955  7 Sheets-Sheet 1

Fig. 1.

INVENTORS.
Everett E. Hosea
BY Adrian T. Godschalx
Carlson, Pitzner, Hubbard & Wolfe
Attys.

Dec. 17, 1957     E. E. HOSEA ET AL     2,816,454
POSITIONING MEANS FOR MACHINE TOOLS Filed Dec. 14, 1955     7 Sheets-Sheet 3

INVENTORS.
Everett E. Hosea
BY Adrian T. Godschalx
Carlson, Pitzner, Hubbard & Wolfe
Attys.

INVENTORS.
Everett E. Hosea
BY Adrian T. Godschalx
Carlson, Pitzner, Hubbard & Wolfe
Attys.

INVENTORS
EVERETT E. HOSEA
ADRIAN T. GODSCHALX

United States Patent Office 2,816,454
Patented Dec. 17, 1957

2,816,454

POSITIONING MEANS FOR MACHINE TOOLS

Everett E. Hosea, Kaukauna, and Adrian T. Godschalx, Appleton, Wis., assignors, by mesne assignments, to Giddings & Lewis Machine Tool Company, Fond du Lac, Wis., a corporation of Wisconsin Application December 14, 1955, Serial No. 553,066

9 Claims. (Cl. 74—472)

The present invention pertains generally to machine tools and the positioning of translatable machine tool components, such for example as the column movable along the bed or the headstock movable along the column of a horizontal drilling machine. More particularly, the invention is concerned with positioning drives or transmissions utilizing magnetic clutches, with the construction of such clutches, and with the control thereof.

The general aim of the invention is to make possible more accurate positioning of translatable machine tool components by drive means including magnetic clutches so constructed and controlled that movement commences very quickly in response to actuation of a control instrumentality and stops smoothly without overshoot upon deactuation of the instrumentality.

In brief, the principal objective of the invention is to provide improved positioning of machine tool components by taking full benefit of the advantages afforded by magnetic clutches while eliminating the disadvantages arising from the inherent time delays, residual torque and residual flux of such clutches.

Another object of the invention is to provide a plural speed ratio transmission for driving a heavy, translatable component of a machine tool, such transmission having magnetic clutches for effecting drive at two or more rates from a prime mover and so controlled as to automatically brake further movement of the component when the drive is terminated.

Still another object is to make possible, through the use of such a transmission with improved magnetic clutches, the translation of a machine tool component toward a desired position at a rapid traverse rate, transition to a slow feed rate as the component approaches the desired position, and a smooth quick stop of the component in the desired position. Another object is to prevent lock-up of the drive to the translatable machine tool components during the transition period while one clutch is being disengaged and the other engaged.

A further object is to provide simplified and convenient controls for magnetic clutches in a drive transmission for a translatable machine tool component, so that an operator may optionally effect rapid traverse or feed by manipulation of but a single control instrumentality such as push button.

Other objects and advantages will become apparent as the following description proceeds, taken in conjunction with the accompanying drawings, in which.

While the invention has been shown and will be described in some detail with reference to a particular embodiment thereof, there is no intention that it thus be limited to such detail. On the contrary, it is intended here to cover all modifications, alterations, and equivalents falling within the spirit and scope of the invention as defined by the appended claims.

Figure 1:
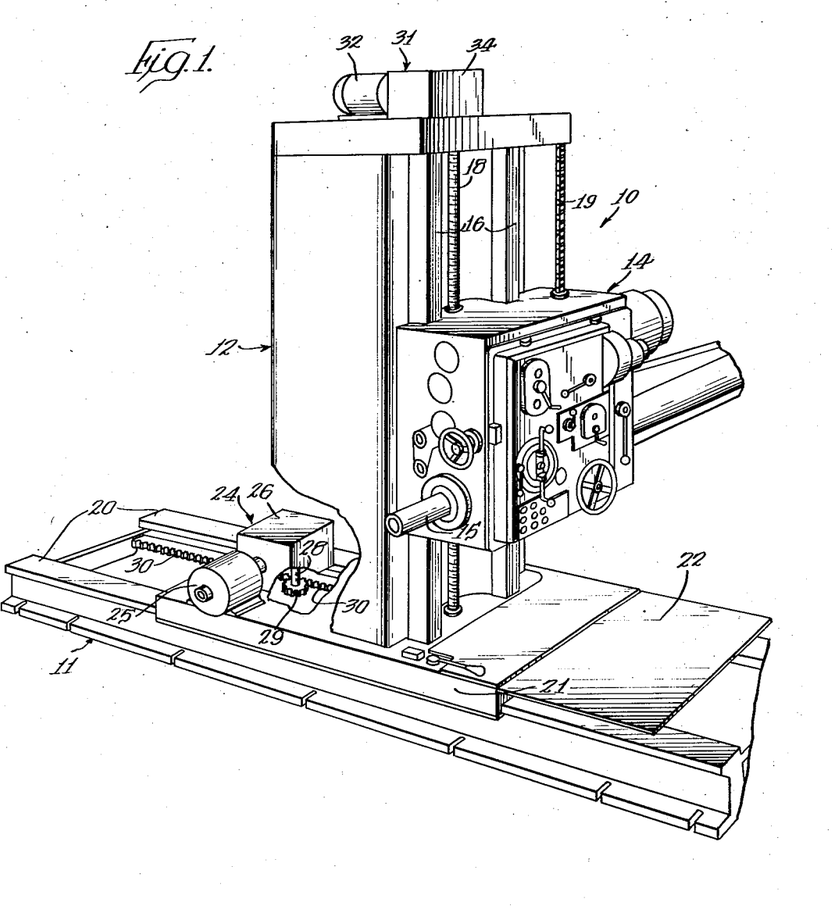
Figure 1 is a perspective view of an exemplary machine tool on which the positioning means of the present invention are employed.

Referring now to Fig. 1, an exemplary machine tool, here a horizontal drilling and tapping machine 10, has been shown as equipped with the positioning means embodying the features of the invention. By way of background environment, the machine 10 is made up of a base or runway 11 supporting an upright column 12 which in turn carries a headstock 14. Projecting from the headstock is a tool-receiving spindle 15 which is rotationally driven at any one of a plurality of speeds for drilling and tapping operations. The spindle is also axially feedable into and out of the headstock and at any one of a plurality of feed rates. For positioning the spindle 15 vertically, the headstock 14 is movable vertically along the column 12, sliding on ways 16. Such movement or translation of the headstock may be effected through a vertical lead screw 18 rotationally driven and having engagement with a cooperating nut (not shown) in the headstock body. Counterweights (not visible) may be provided in the column itself and connected by a chain 19 or other similar means to the headstock in order to reduce the load on the lead screw 18 and effect smoother translation.

For positioning the spindle 15 in a horizontal direction transverse to its own axis, the column 12 is translatable along the base 11, having sliding engagement with spaced horizontal ways 20 formed on the base. The column has an enlarged foot 21 which has cooperating surfaces slidably resting on the ways 20. Preferably, a platform 22 is rigidly connected to the foot 21 so that an operator may ride thereon while the column is moving and thus conveniently manipulate the various control instrumentalities on the face of the headstock 14.

Power for translating the column 12 along the ways 20 is provided by a drive unit 24 mounted on the column foot 21 and including a suitable reversible prime mover or electric motor 25 coupled through a multi-speed transmission 26 to an output shaft 28 mounting a pinion 29. The latter is engaged with a rack 30 extending longitudinally of and mounted on the base 11. As explained more fully below, the transmission 26 includes speed change gearing together with magnetic clutches for changing the drive ratio so that, for a constant speed of the motor 25, the column may be translated along the ways 20 either at a rapid traverse rate or at a slower, feed rate. By appropriate control means to be described, the column 12 may be moved rapidly toward a desired position, then moved at the slower feed rate as it closely approaches the desired position, and finally stopped without overshoot in the desired position.

For moving the headstock 14 vertically to different elevational positions on the column 12, a drive unit 31, similar to the unit 24, is mounted atop the column. The unit 21 includes a prime mover or motor 32 working through a speed change transmission 34 having its output shaft connected to rotate the lead screw 18 in either forward or reverse directions and at either a rapid traverse or feed rate. Since the driving units 34 and 31, and the controls therefor, may be substantially identical except that the former works through the pinion 29 and rack 30 while the latter drives the lead screw 18, it will suffice to describe in detail only the construction and controls of the drive unit 24.

Figure 2:
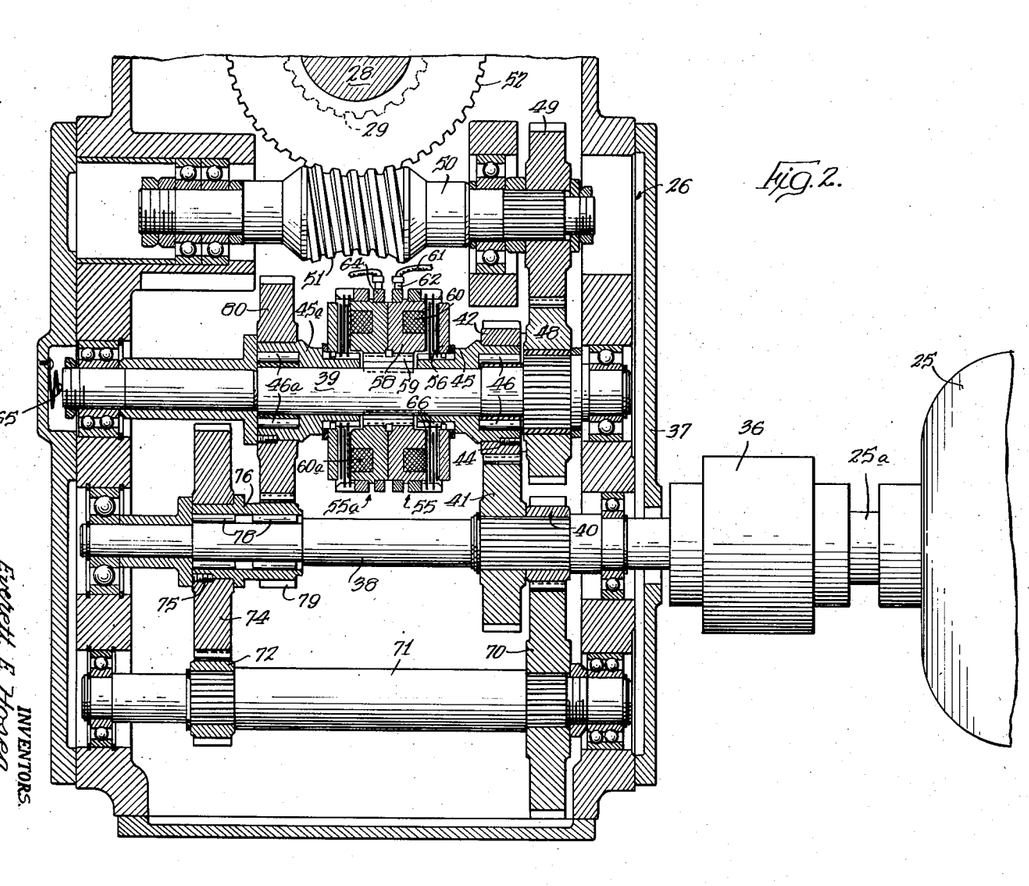
Fig. 2 is a layout or developed view of a plural speed transmission used for positioning a translatable component of the machine tool shown in Fig. 1.

While the specific gearing arrangement for the transmission 26 and the number of traverse or feed rates it provides may vary, an exemplary and preferred organization has been illustrated in Fig. 2. As there shown, the shaft 25a of the motor 25 is connected through a coupling 36 to drive a first transmission shaft 38. The latter is journaled by appropriate anti-friction bearings within the transmission housing 37. Splined fast to the shaft 38 are a pair of gears 40, 41, the latter meshing with a mating gear 42 rigidly locked as by a plurality of machine screws 44 to a sleeve 45 which, in turn, is journaled by anti-friction bearings 46 on a second shaft 39. The latter shaft is itself journaled by suitable anti-friction bearings in the transmission housing 37 and has a spur gear 48 rigidly connected or splined to its right end. The latter gear is drivingly meshed with a mating gear 49 splined to a third transmission shaft 50 journaled in the housing 37 and formed, in this instance, with a worm gear portion 51. The worm gear 51 cooperates with a worm wheel 52 mounted fast on the output shaft 28 which carries the pinion 29 meshing with the rack 30, as previously described with reference to Fig. 1.

Figure 10:
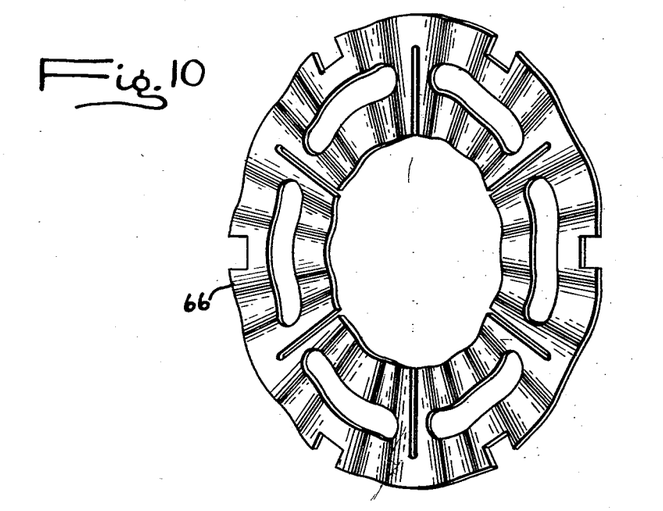
Figs. 10 and 11 are perspective views of two respective types of laminations used in the magnetic clutches.
Figure 11:
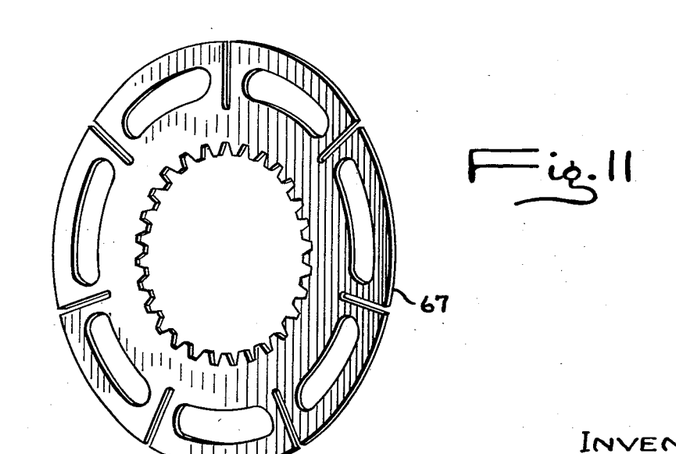

To complete a rapid traverse drive path from the motor shaft 25a to the pinion 29, a magnetic clutch 55 is interposed between the sleeve 45 and the shaft 39. The clutch 55 (see also Fig. 3) includes an armature 56 splined to the sleeve 45 so that the two may have relative axial movement but not relative rotational movement. A clutch body 58 is splined to a key bushing 59 which is in turn keyed to the shaft 39. The body 58 is thus fixed rigidly to the shaft 39. Embedded within the body 58 is an electric coil 60 supplied with energizing current through a conductor 61 and a brush 62 riding on a slip ring 64, the return current path being through the body 58 and shaft 39 to ground. In order to prevent return current from flowing across meshing gear teeth and through the moving parts of the anti-friction bearings with possible damage to the same, a spring biased grounding brush 65 (Fig. 2) is preferably interposed between the end of the shaft 39 and the housing. Between the armature 56 and body 58 is a stack of laminations, alternate ones 66, 67 of which are non-rotatably fixed with freedom for slight axial movement to the body 58 and the sleeve 45, respectively. As here shown the laminations 67 (Fig. 11) are internally notched for reception on splines of the sleeve 45, while the laminations 66 (Fig. 10) are externally notched to have spline-like engagement with lugs 57 projecting axially from the body 58 at circumferentially spaced locations. To yieldably separate the armature 56 from the body 58 and permit relative slipping of the laminations 66, 67, the alternate ones, i. e., laminations 66 are made of wavelike form from resilient steel, as shown to a greatly exaggerated degree in Fig. 10 for purposes of illustration. The laminations 66 themselves thus serve as a clutch-releasing spring.

Figure 3:
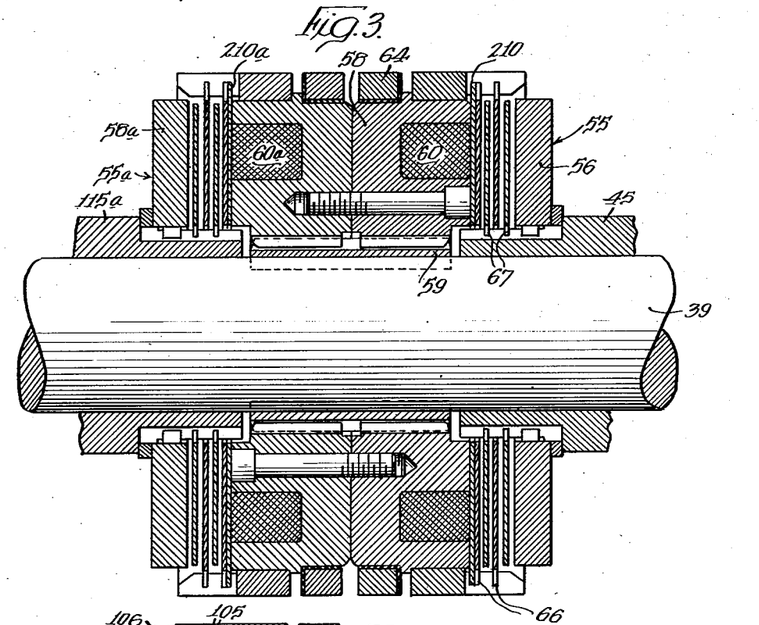
Fig. 3 is an enlarged sectional view of the magnetic clutches employed in the transmission shown by Fig. 2.

As the coil 60 is energized to attract the armature 56 toward the body 58, the lamination stack is compressed and the alternate disks 66, 67 frictionally locked so that the sleeve 45 may drive the shaft 39. In this manner, the rapid traverse rate for the column 12 is obtained, the drive path from the motor 25 including the shaft 38, gear 41, gear 42, sleeve 45, locked laminations 66, 67, clutch body 58, shaft 39, gears 48 and 49, worm gear 51, worm wheel 52 and thence the pinion 29 meshed with the rack 28.

For providing a second, lower drive ratio to slowly feed the column 12 along the ways 20, an alternative drive path is provided and rendered optionally effective when a second magnetic clutch 55a is engaged. As here shown, the small gear 40 fast on the shaft 38 meshes with a larger, mating gear 70 splined to a fourth shaft 71. On its opposite end, this shaft carries a small splined gear 72 meshing with a larger gear 74 locked fast to a sleeve 76 by staked machine screws 75. The sleeve 76 is freely journaled on the shaft 38 by anti-friction bearings 78, and has integrally machined on one end thereof a small spur gear 79. The latter gear meshes with a larger gear 80 which is fixed rigidly to a sleeve 45a journaled on the shaft 39 by anti-friction bearings 46a. The clutch 55a (see also Fig. 3) is associated with the sleeve 45a and the shaft 39 in substantially the same manner as previously described in connection with the sleeve 45 and the clutch 55. It will therefore be seen that upon energization of the clutch coil 60a, the gear 80 and the sleeve 45a are locked to the shaft 49 so that the latter is positively driven from the motor through the step-down gears 40, 70, the step-down gears 72 and 74, and the step-down gears 79 and 80, the shaft 39 thus being driven at a slower speed and the gear 48 in turn driving the gear 49 and the worm portion 51 at a slower rate so that the pinion 29 is turned slowly and causes the column 12 to move at a very slow feed rate. By way of example, the gear ratios and the motor speed may be so chosen that the rapid traverse rate for the column when drive is taken through the magnetic clutch 55 is in the order of 80 inches per minute, while the slower feed rate when drive is taken through the clutch 55a is in the order of 4 inches per minute.

Figure 4:
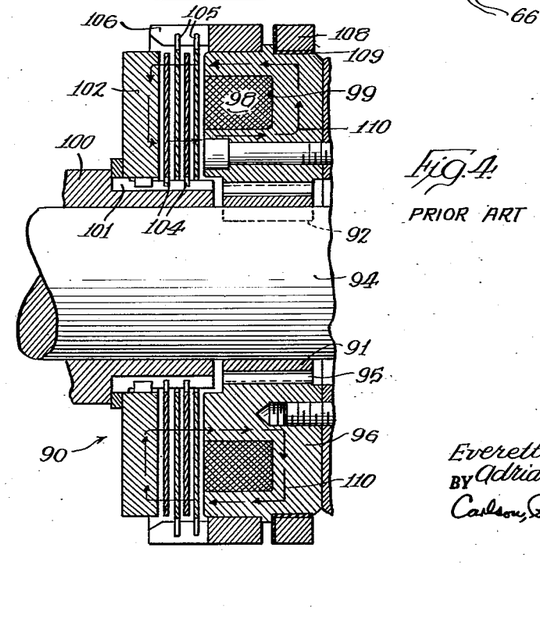
Fig. 4 is a sectional view of a prior art magnetic clutch shown here for comparison with the clutches illustrated in Fig. 3.

Before considering the improved construction of the electro-magnetic clutches 55 and 55a and the manner in which they are controlled to provide advantageous positioning operation, it will be helpful to understand the construction of a prior art clutch 90 shown in Fig. 4. This prior art clutch is one which is commercially available and which is characterized by the fact that it employs interleaved laminations compressed into frictional engagement in response to magnetic flux produced upon energization of a coil, such flux passing through a closed path of low permeability including the laminations themselves.

Briefly, the clutch 90 includes a bushing 91 keyed as at 92 to a shaft 94 and splined as at 95 to receive a clutch body 96 made of high permeability material such as ferromagnetic alloy. The clutch body 96 is thus made fast to the shaft 94. An electro-magnetic coil 98 possessing considerable inductance is embedded in a large annular groove 99 formed in one face of the body 96.

The part which is to be selectively locked to the shaft 94 is a sleeve 100 (partially shown) which is normally rotatable relative to the shaft and may be journaled directly thereon. The sleeve 100 is splined as at 101 and receives a correspondingly splined, annular high permeability armature 102. The armature 102 is, therefore, normally free to rotate relative to the clutch body 96 and has freedom to shift axially of the latter. Interposed between the armature 102 and the clutch body 96 is a stack of annular laminations made of a high permeability material. Alternate laminations 104 are internally notched for reception on the splines 101 of the sleeve 100, while the other alternate laminations 105 are notched in their peripheries to be received on a series of lugs 106 projecting axially from the periphery of the clutch body 96. The laminations 105, therefore, have a spline-like connection to the body 96, being held against relative rotation relative to the body but having freedom for limited relative axial movement.

Current is supplied to the coil 98 through a brush riding on a slip ring 108 supported by an insulating collar 109 on the body 96. The opposite end of the coil 98 is grounded directly to the body 96 so that return current may flow through the body and the shaft 94.

The laminations 104, 105 are made of a resilient steel and one set is given a wavy shape (see Fig. 10, for example) so that they act as springs normally tending to separate the armature 102 axially from the body 96 and thus tending to separate from one another so that relative slippage may occur. With the coil deenergized, therefore, the laminations 104, 105 are substantially separated from one another as shown in Fig. 4, having only light frictional contact. However, when the coil 98 is energized it sets up magnetic flux in a closed path represented by the arrows 110 in Fig. 4 so that the armature 102 is drawn toward the body 96, thereby compressing the laminations 104, 105 and flattening them sufficiently so that they are locked by frictional engagement.

When employed with gear means and other mechanisms requiring lubrication, the clutch 90 is operated partly submerged in lubricating oil or with lubricating oil poured or sprayed over it. This, of course, minimizes wear on the laminations but introduces the necessity each time a coil is energized, that the oil between the laminations be squeezed out before they can have sufficiently great friction therebetween to lock the armature 102 and sleeve 100 rotationally rigid to the body 96.

As thus far described, the clutches 55 and 55a are identical with the prior art clutch 90. In order to understand the present invention in the modified construction and control of the clutches 55, 55a it will be helpful to first consider the performance of the prior art clutch.

When a magnetic clutch of the type illustrated in Fig. 4 is employed in positioning drive means such as the transmission shown by Fig. 2, the time delays between the instant that the clutch coil is energized or deenergized and the instant that the clutch becomes fully engaged or disengaged become most critical and important. Moreover, the variation of the torque transmittable by the clutch during these time delay intervals also seriously affects the operation and accuracy of the positioning means. For a better understanding of the difficulties encountered in the use of the clutch 90 shown by Fig. 4, and in conventional controls therefor, reference may best be made to Figs. 6 and 7.

Figure 6:
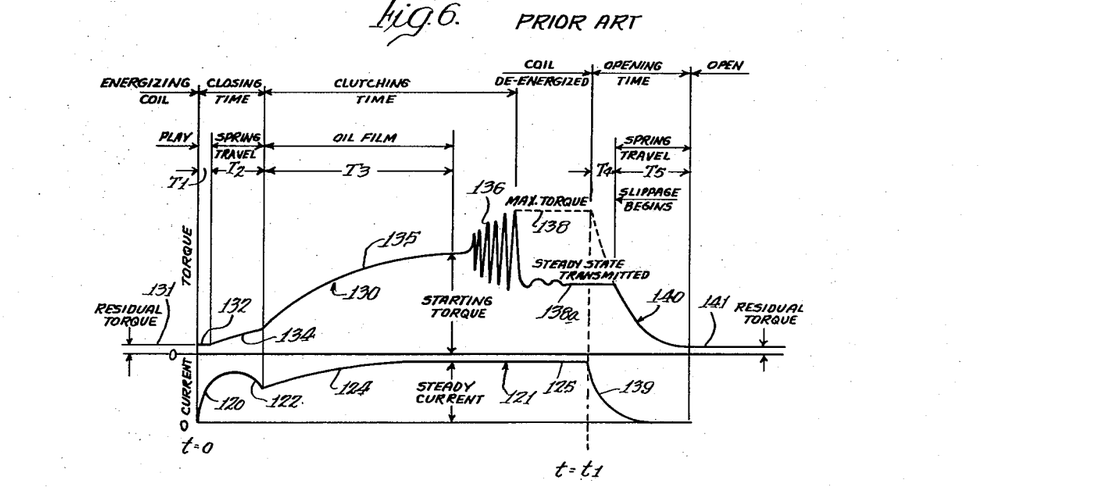
Fig. 6 is a graph illustrating the variation in energizing current and transmitted torque with time for the prior art clutch shown by Fig. 4.

Referring to Fig. 6, assume that the clutch coil 98 is connected to an appropriate direct current voltage source at the time instant indicated $t=0$ on the graph. The current begins a rather rapid build-up as shown in the region 120 on the current graph 121. This rapid rise in the region 120 results from the fact that with the armature 102 and the laminations 104, 105 separated from the body 96 by the maximum amount possible, an effective air gap is created in the magnetic flux path so that the inductance presented by the coil 98 is relatively low. However, as the armature is attracted toward the body 96 and compresses the laminations 104, 105 then the air gap is gradually closed, creating a flux path of lower reluctance and thus increasing the effective inductance of the coil 98. It is for this reason that the current levels off and actually decreases in the region 122 of the graph 121. After the air gap has been closed, the coil has a higher inductance and current build-up proceeds relatively slowly as shown by the region 124 in the current curve. Finally, a steady state condition is obtained as indicated by the region 125 in the current curve.

A graph 130 illustrates the variations in torque transmitted by the clutch during the period that the current is building up to its steady state value. As shown, the clutch 90 has a certain residual torque indicated by the curve portion 131 before the instant $t=0$ that the clutch coil is energized. This residual torque results primarily from the residual flux existing from previous energizations of the coil, the magnetic circuit having inherent retentivity. The thickness and viscosity of the oil film between adjacent laminations also contribute slightly to this residual torque. From the instant that the energizing voltage is applied to the coil 98, the torque transmitted by the clutch remains constant at the residual value as shown by the curve portion 132 during the time delay interval T1. This time delay is occasioned by the fact that the laminations 104, 105 are not appreciably compressed during the period that the armature 102 is moving through the space which initially separates it from the lamination stack. Then, as the armature begins to compress the laminations, the transmitted torque gradually builds up as shown by the curve portion 134. This results in a certain time delay interval designated T2, however, owing to the necessity that the wavy, spring-like laminations 104, 105 must be compressed somewhat before they are in driving frictional engagement. There is an inherent mechanical time constant in compressing such springs with a given force applied by the armature 102. Finally, after the laminations have been substantially flattened, it is necessary that the oil between them be squeezed out before they may have firm or locking frictional engagement. An inherent time delay or interval T3 is necessary for the oil to be squeezed from between the laminations and during this period the torque transmitted by the clutch builds up gradually as indicated by the curve portion 135. At the end of the period T3, the torque has reached a starting value and the clutch assumes its driving function. However, there is a period of "chatter" or intermittent rubbing of the adjacent laminations 104, 105 during which the coefficient of friction between them changes alternately from the static to the kinetic value. This causes the transmitted torque to change violently as indicated by the curve portion 136 until it finally settles at the maximum value illustrated by the curve portion 138. After the load has been accelerated, a smaller torque is necessary to maintain it as a constant speed. The torque actually transmitted to the load is thus somewhat lower as shown by the curve portion 138a. In the event that the load should impose a greater torque on the clutch, the clutch will transmit that torque until it exceeds the maximum value at which the laminations begin to slip relative to one another. It will be seen, therefore, that a relatively large time delay consisting of the sum of the periods T1, T2, T3 is required from the instant that the coil is energized from the voltage source until it reaches its rated torque value.

Consider next that the circuit for the clutch coil 98 is interrupted at the time instant $t=t_1$ as shown in Fig. 6. Since the coil 98 possesses considerable inductance due to a tightly closed magnetic flux path made up of the highly permeable armature 102, clutch body 96 and compressed laminations 104 and 105, the current therethrough does not cease immediately but decays exponentially as shown by the current curve portion 139. During this current decay interval, consuming a period of time designated T4, the transmitted torque remains substantially at the steady state value illustrated by the torque curve portion 138. At the end of the period T4, the laminations 104, 105, begin to slip relative to one another although still transmitting some torque which decays exponentially as illustrated at 140 as the laminations separate from one another and spring back to their normal wavy shape. This consumes a period of time designated T5 after which the torque levels out at its residual value illustrated by the torque curve portion 141. It will thus be evident that a considerable period of time consisting of the intervals T4 and T5 is required from the instant that the clutch coil circuit is broken until the clutch is fully disengaged.

Figure 7:
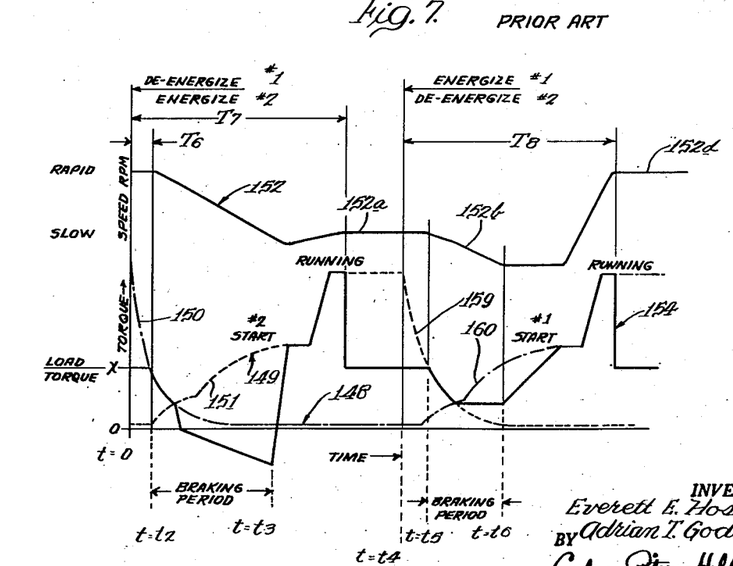
Fig. 7 is a graph showing variations in clutch torque, load speed, and torque transmitted to the load during transition periods as drive is switched from one prior art clutch to another.

Fig. 7 illustrates the transition of torque between two clutches of the type shown in Fig. 4 when alternately energized to provide alternate drive therethrough in a transmission such as that shown by Fig. 2. That is, one of the clutches will be energized and one deenergized, and the energization pattern switched to produce a change in the drive ratio. Assume that a first clutch #1 is initially driving the load and a second clutch #2 is deenergized. The torques transmittable by the two clutches are respectively depicted by dash-dot and dotted graphs 148 and 149, while the torque actually transmitted to the load is shown as a solid line graph 154.

Now if at the instant $t=0$ as shown in Fig. 7, the clutch coil for clutch #1 is deenergized and the coil for clutch #2 energized, the torque transmitted by the #1 clutch drops exponentially as shown by the torque curve portion 150 while the torque transmitted by the #2 clutch builds up slowly, as explained in connection with Fig. 6 and indicated by the torque curve portion 151. It will be seen that no change in the speed of the driven load, indicated by the graph curve 152, occurs during the time interval T6 required for the torque of the #1 clutch to drop below the torque applied to the load.

There is a braking period when both the #1 and the #2 clutch tend to couple the prime mover or motor to the driven load. Thus they tend to lock and will impose an undue strain on the prime mover unless provision is made to cause the #1 clutch to have its torque decrease faster or the #2 clutch to have its torque build up much faster. It will be seen that in the period between the time instants $t2$ and $t3$, the two clutches effectively brake the prime mover, each clutch working against the other. Finally, when the torque for the #2 clutch reaches its steady state value, it assumes normal driving operation. It will be observed from the variation in load speed illustrated by the curve 152 that the moving member actually falls below the slower speed intended when the #2 clutch is driving in steady state operation. Finally, the speed rises to the steady state lower value as indicated at 152a. A total time interval T7 is thus required from the instant of actuation until the load reaches the desired speed.

Now, if the #1 clutch is energized and the #2 clutch is deenergized at the instant $t=t_4$, the torque of the #2 clutch falls off gradually as indicated at 159, and the torque for the #1 clutch begins a gradual build-up as indicated by the curve portion 160. As a result, the two torque curves 159, 160 cross each other and actually produce a braking effect during the period between the instants $t=t_5$ and $t=t_6$. Due to this braking action, the speed of the load as indicated by the portion 152b of the speed curve 152 actually drops below its slower steady state value. If the clutches have torque ratings of the same order, it has been found that they stall the prime mover and create overloads on it. Burn-out of an electric motor can result, or at least tripping of current overload devices. If the #1 clutch is chosen to have a higher torque rating, it will "break" the residual torque of the deenergized #2 clutch. This, however, causes the machine tool component to "jump," after which the load speed rises again to the higher steady state value at 152d. Thus, a delay interval designated T8 is necessary to produce the speed change.

In accordance with the present invention, the performance of the two clutches 55, 55a, and of the plural speed transmission (Fig. 2) of which they are a part, is enhanced, first, by connecting the clutch coils so that they are both normally energized whereby the release of one leaves the other instantly in driving connection between the prime mover and load. Secondly, a capacitor is connected in parallel with each of the inductive clutch coils to form an oscillatory discharge circuit which quickly kills current through the coil when the latter is deenergized. This makes the release time for the clutches much shorter. Thirdly, means are provided in each clutch to decrease the retentivity of the magnetic flux path, thereby reducing the residual flux of the resulting residual torque when the clutch is deenergized. This largely eliminates energy-consuming "drag," and it lessens the possibility of "lock-up" as the drive is switched from one clutch to another.

Figure 5:
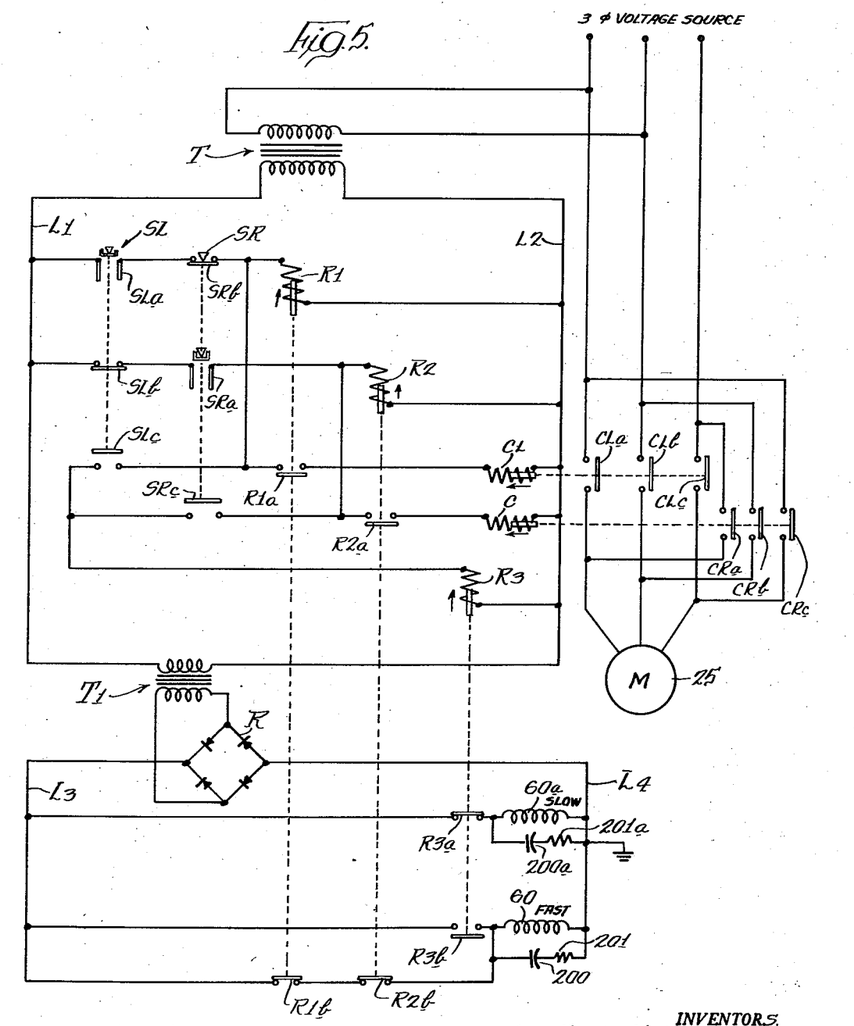
Fig. 5 is a schematic circuit diagram of electrical controls for the positioning means shown in Figs. 1-3.

Referring now in more detail to Fig. 5, a preferred control for the coils 60, 60a of the two clutches 55, 55a is there shown. By way of introduction, the drive motor 25 in this instance is of the reversible three-phase induction type. It is energized in forward or reverse directions from a three-phase voltage source through contacts CL$a$–$c$ and CR$a$–$c$, respectively. These contacts are controlled by coils CL and CR, respectively, of "left" and "right" contactors which thus permit energization of the motor 25 to drive the machine column 12 (Fig. 1) either to the left or to the right, respectively.

For jointly controlling the contactor coils CL and CR and the clutch coils 60, 60a, a control circuit is energized from two of the three phase lines through a step-down transformer T. The secondary winding of this transformer places a reduced control voltage between the lines L1 and L2. To energize the motor 25 so that it drives the column 12 to the left, a push button switch SL having three contacts SL$a$, SL$b$, and SL$c$ is depressed. Similarly, actuation of a second push button switch SR, having three contacts SR$a$, SR$b$ and SR$c$, results in energization of the motor 25 such that the column 12 is driven to the right. It is important to notice that the contacts SL$a$ and SR$a$ are of the "wiping" type so that they maintain engagement over a considerable range of travel. The push button switches SL and SR are constructed and arranged such that depression through a first short distance results in closing of the normally open wiping contacts SL$a$ and SR$a$ and in opening of the respective normally closed contacts SL$b$ and SR$b$, without closing the normally open contacts SL$c$ and SR$c$. Upon further movement of the push buttons, however, the two normally open contacts SL$c$ and SR$c$ close while the wiping contacts SL$a$ and SR$a$ remain closed.

It will be seen from Fig. 5 that depression of the push button switch SL through either a small or large distance will result in closure of the contacts SL$a$ which thereby energizes the coil of a control relay R1 through the normally closed contacts SR$b$. At the same time, the normally closed contacts SL$b$ open to prevent simultaneous energization of the coil of a second control relay R2. Pick-up of the relay R1 results in closure of its normally open contacts R1$a$, energizing the contactor coil CL through the now closed push button contacts SL$a$ and the normally closed push button contacts SR$b$. Accordingly, the contacts CL$a$–$c$ close to energize the motor 25 so that the column 12 of the machine (Fig. 1) moves to the left.

The push button switch SR similarly controls the energization of the contactor coil CR. Depression of the switch SR results in closure of the normally open contacts SR$a$ which energize the relay coil R2 through the normally closed contacts SL$b$. The contacts SR$b$ open to prevent inadvertent simultaneous energization of the relay coil R1. Pick-up of the relay R2 and the consequent closure of its normally open contacts R2$a$ results in the energization of the contactor coil CR through the normally closed contacts SL$b$ and the now closed contacts SR$a$. Thus, the contacts CR$a$–$c$ close to energize the motor 25 in the opposite direction so that the machine column 12 (Fig. 1) moves to the right.

Since the magnetic clutches operate more satisfactorily if their coils are controlled with direct voltage, the clutch coils 60, 60a are connected in a separate direct current control circuit energized through a second transformer T1 and a full wave rectifier R which thus places a direct potential between lines L3 and L4. In accordance with the practice of this invention, the clutch coils 60, 60a are both normally energized. The coil 60 for the clutch 55 which produces rapid traverse of the column 12 is normally connected across the lines L3, L4 through normally closed, series connected contacts R1$b$ and R2$b$ of the relays R1 and R2, respectively. The coil 60a for the clutch 55a which produces slow or feed movement of the column 12 is normally connected directly between the lines L3 and L4 through normally closed contacts R3a of a third control relay R3. It will be observed that the clutch coil 60 may also be alternatively energized through normally open contacts R3b which are closed upon energization of the coil R3.

The coil R3 is connected into the control circuit such that it will be energized whenever either of the push button switches SL or SR is depressed through the maximum distance, i. e., when either of the contacts SLc or SRc are closed. As here shown, the coil R3 is connected in parallel with the coil R1 through the normally open contacts SLc so that the relay R3 will be picked up whenever the switch SL is depressed to its second position. In like manner, the coil R3 is connected in parallel with the coil R2 through the normally open contacts SRc so that the relay R3 will be picked up whenever the push button switch SR is depressed to its second position.

If movement of the column at the slow or feed rate is desired, the switch SR or the switch SL, depending upon the direction of movement desired, is depressed to its first position. Accordingly, either the relay R1 or the relay R2 will be energized and the motor 25 will run in one direction or the other, as explained before. With this, also, either the relay contacts R1b or the contact R2b will open, thereby deenergizing the clutch coil 60 and releasing the corresponding clutch 55 so that the coil 60a remains energized and the "slow" clutch 55a transmits power through the transmission. If it is desired to traverse the column, or move it at a faster rate, either of the push button switches SL or SR, depending upon the direction of movement desired, is depressed to its second position. This leaves either the relay R1 or the relay R2 energized but additionally closes the contacts SLc or SRc. As a result, the relay R3 is picked up so that the contacts R3a open and the contacts R3b close. With this, the coil 60a is deenergized and the coil 60 is energized so that the clutch 55a is released and the clutch 55 engaged to transmit power through the transmission shown by Fig. 2. The column will continue its rapid traverse as long as either of the switches SL or SR is held fully depressed. As the column approaches a desired position, the operator need only let up slightly on the push button switch so that the contacts SLc or SRc, as the case may be, open to drop out the relay R3. This results in closure of the contacts R3a and opening of the contact R3b so that the coil 60a is again energized and the column progresses at the feed rate. When the desired position is reached, the operator releases the push button switch entirely thereby deenergizing the relay R1 or R2, as the case may be, dropping out the motor contactor and causing closure of the contacts R1b and R2b so that both of the clutch coils 60 and 60a are energized. With both clutches 55, 55a thus engaged, the positioning drive is effectively braked so that it comes to a smooth halt in the position desired. It is a very simple matter to place the column in exactly the desired position to the nearest 0.0001 of an inch by intermittently pressing one of the push buttons SL or SR to jog the drive.

Real advantages accrue from the control of the clutch coils in the manner described, i. e., such that they are both normally energized and the coil for that clutch which is to be inactive is deenergized upon movement of the control instrumentality such as the push button switches SL and SR.

Figure 9:
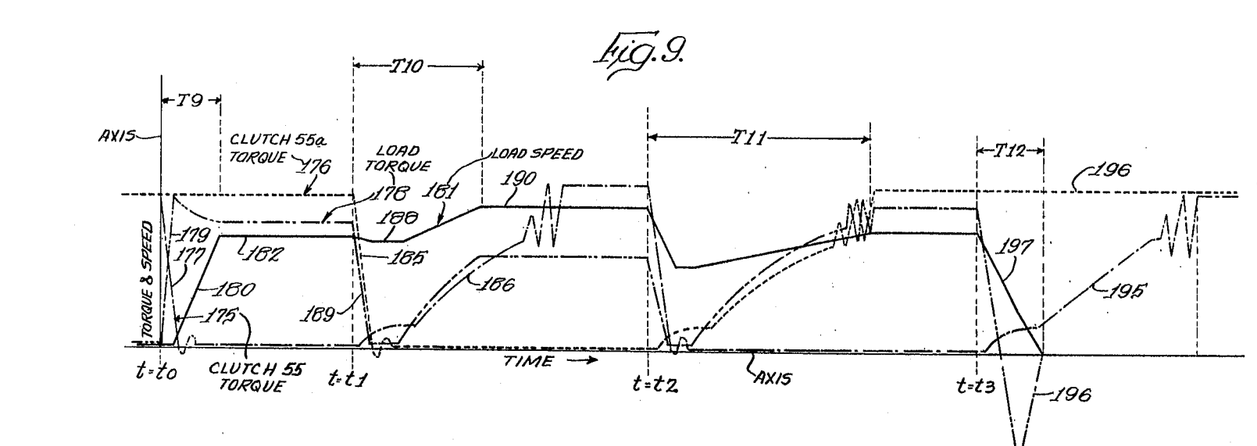
Fig. 9 is a graph similar to Fig. 7 but illustrating transition from one clutch to another in the arrangement illustrated by Figs. 2 and 3 with the control means shown in Fig. 5.

Turning back to Fig. 6, it may be observed that if the clutch coils were both normally deenergized and it was necessary to energize the one which is to be active, then a delay period equal to the sum of the intervals T1, T2 and T3 would be necessary from the instant of actuation until the drive would actually begin. Fig. 9 shows the variations in torque transmissible by the two clutches 55 and 55a, the torque of the former being represented by the dash-dot curve 175, the torque of the latter being represented by the dotted curve 176. If one of the push buttons SL or SR is depressed at the instant $t=0$, as shown in Fig. 9, then the torque transmissible by the clutch 55 drops very rapidly as shown by the curve portion 177. However, the coil 60a for the clutch 55a is already energized and this clutch is instantly able to transmit its maximum torque. Accordingly, the torque applied to the load, represented by the dash-double-dot curve 178 rises almost instantaneously as shown by the curve portion 179 to the maximum torque transmissible by the clutch 55a. The load, e. g., the column 12, thus immediately begins acceleration as shown by portion 180 of the solid line curve 181 representing load speed. The column thus reaches full speed at the feed rate, as represented by the curve portion 182 in the very short time interval designated T9 in Fig. 9. This interval T9 is very much shorter than the sum of the intervals T1, T2 and T3 in Fig. 6, thus illustrating that the present control arrangement produces faster starting of the column in response to actuation of one of the instrumentalities or push button switches SL or SR.

As explained above, the time instant $t=t_0$ as shown in Fig. 9 represents the instant that one of the push button switches SL or SR is depressed to initiate column movement. The time instant $t=t_1$ represents the instant that the push button switch is depressed to its second position thereby causing transition of the drive from the feed rate clutch 55a to the rapid traverse clutch 55. It will be seen that immediately after the push button is so actuated, the torque transmitted by the clutch 55a decays very rapidly as shown by the portion 185 of the curve 176. At the same time, the torque transmissible by the other clutch 55 begins an exponential build-up as shown by the portion 186 of the curve 175. As a result, the torque transmitted to the load drops momentarily and the speed of the load decreases as shown by the curve portions 188 and 189 respectively. As the torque for the clutch 55 builds up, it increases the torque transmitted to the load until the load speed increases to the full traverse rate as shown by the curve portion 190. This complete transition from the feed rate to the traverse rate occurs during the period T10 which is very much shorter than the corresponding interval T8 obtainable with the prior art arrangement as illustrated in Fig. 7. The same sort of transition occurs when the button is released from its second position to its first at the instant $t=t_2$ as shown in Fig. 9. In this case, the transition from the traverse rate to the feed rate is accomplished in the period T11 from the instant that the push button switch is released to its first position. The period T11 is relatively short as compared to the corresponding period T7 in Fig. 7, showing that faster transition is obtained by the control arrangement described in connection with Fig. 5.

Finally, at the time instant $t=t_3$, as shown in Fig. 9, the selected push button switch is completely released so that both clutches 55, 55a become energized and the drive motor is deenergized, as explained, bringing the column to a halt. As shown by the curve portion 195, the torque transmissible by the clutch 55 builds up smoothly from the instant $t=t_3$, while the torque for the clutch 55a as shown by the curve portion 196 remains as the maximum value. Accordingly, as the torque transmissible by the clutch 55 builds up, the two clutches 55, 55a work in opposition to one another and exert a braking force on the load, i. e., a rather high negative torque as illustrated by the portion 196 of the load torque curve 178. The speed of the load thus drops rapidly as shown by the curve portion 197 so that all motion is stopped at the end of the very short period T12 from the instant $t=t_3$ when the push button switch was released. This very rapid stopping of the column results from the fact that the two clutches normally energized, as explained in connection with Fig. 5, automatically and quickly exert a braking effect whenever the push button is released; and the result is that the column may be jogged through very short distances for precise location at a desired position with little chance of overshoot.

In carrying out another important aspect of the invention, capacitors 200, 200a are connected in parallel with the respective clutch coils 60, 60a (Fig. 5). In some instances it may be desirable to include small resistors 201, 201a in series with the respective capacitors. The size of each capacitor is so chosen with respect to the inductance of the clutch coil that an oscillatory discharge circuit is obtained. The circuit is damped to a point approaching the classic "critical" case by the resistance of the coil augmented, if need be, by the small resistor in series with the capacitor. With this, when the energizing circuit for the clutch coil is broken, as the opening of the contacts R3a for the coil 60a as shown in Fig. 5, energy is rapidly transferred by current oscillation between the capacitor and the coil. In this process, the energy is dissipated by the resistance of the circuit. Thus, the current through the clutch coil decreases very rapidly as a one-quarter cycle of oscillation occurs, swings negative to a small amplitude for one-half cycle of oscillation, then swings positive to a very low amplitude for one-half cycle of oscillation and then goes substantially to zero. The net result is that the currents through the clutch coils 60, 60a are "killed" very quickly whenever the respective energizing circuits are broken. Correspondingly, the magnetic flux is killed rapidly so that the torque transmissible by the clutches goes to zero and the clutches release in a very short time interval.

Figure 8:
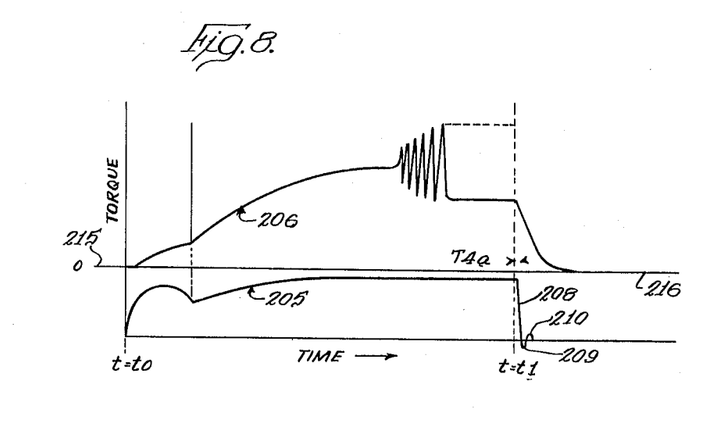
Fig. 8 is a graph similar to Fig. 6 but illustrating the variations in transmitted torque and coil current with time for one of the improved clutches illustrated by Fig. 3 as its coil is energized and deenergized.

Fig. 8 is similar to Fig. 6 but depicts the current and torque variations, by the curves 205 and 206, respectively, for one of the clutches 55 or 55a when energized at the time instant $t=t_0$ and deenergized at the time instant $t=t_1$. It will be observed that, immediately after the instant $t=t_1$ the current drops abruptly through a one-quarter cycle of oscillation as shown by the curve portion 208, reverses for a small amplitude one-half cycle of oscillation as shown at 209, goes positive for a very low amplitude one-half cycle of oscillation indicated at 210 and then decreases substantially to zero. The current and the magnetic flux of the clutch thus drops to zero in the almost negligible time period T4a. Comparing this with the prior art performance depicted by Fig. 6, it will be observed that the delay interval T4 is substantially eliminated by the present arrangement. Only a relatively short delay T5a as shown in Fig. 8 is necessary before the torque transmissible by the clutch reaches zero value.

Turning again to Fig. 9 it will be observed from the curve portions 185, and 186 that upon transition from one clutch to another the torque of the previously energized clutch drops to zero almost before the torque of the other clutch has reached an appreciable value. Accordingly, there is little or no tendency for the two clutches to oppose one another and "lock up" the drive, possibly imposing an undue load on the driving motor.

Another important advantage provided by the flux-killing capacitors 200, 200a is that the discharge oscillation actually swings negative for a period as indicated at 209 in Fig. 8. This tends to reverse the direction of flux in the magnetic path and to swing it with decreasing amplitude about the zero point. Accordingly, there is less residual flux left in the magnetic circuit after the clutch is deenergized than would be the case if the coil current were permitted to decrease smoothly to zero.

In keeping with another aspect of the invention, means are provided to decrease the permeance or increase the reluctance of the magnetic path. As explained before, the clutches 50, 55a illustrated in Figs. 2 and 3 are in general similar to the prior art clutch illustrated in Fig. 4. However, in carrying out the invention a structurally simple but operationally important modification is made by providing a high reluctance element in the magnetic path which greatly reduces the residual flux when the clutch coil is deenergized. For this purpose, a shim which may take the form of an additional lamination, and which is made of some low permeability material such as brass, is added to each stack of laminations 66, 67 and 66a, 67a. As previously indicated the clutch armatures 56, 56a and the clutch bodies 58, 58a as well as the clutch laminations, are all usually made of high permeability material. The term "high permeability" as used in this specification and the appended claims connotes permeability which greatly exceeds that of air and which is in the order of the permeability possessed by ferromagnetic material such as iron, nickel, cobalt and alloys thereof. The term "low permeability" connotes permeability which is in the order of that possessed by free air space, for example, the permeability of brass. As illustrated particularly in Fig. 3, two low permeability brass laminations 210, 210a are inserted in each of the lamination stacks for the two clutches 55, 55a. These auxiliary laminations may be identical with the laminations 67, 67a except for the fact that they are made of low permeability material in contrast to the high permeability material of the other laminations. The thickness of these auxiliary laminations may be, for example, in the order of 0.005 inch, so that little sacrifice is made in the force with which the laminations are compressed when the clutch coil is energized.

Several advantages accrue from the use of these small auxiliary laminations. First, as soon as the respective clutch coils are deenergized, the high reluctance afforded by the auxiliary laminations causes the flux to die out more rapidly so that the clutch opens much faster. This in part accounts for the rapid decrease of the clutch torques as illustrated by the curve portions 176 and 185 in Fig. 9. Also important is the fact that residual flux passing through the laminations when the clutch is open, due to the inherent retentivity of the magnetic materials, is considerably reduced by the presence of these low permeability auxiliary laminations. Referring particularly to Fig. 8, it will be seen from the portions 215, 216 of the torque curve 206 that the residual torque transmissible by the clutch when its coil is deenergized is reduced substantially to zero. This is important when contrasted with the residual torque which exists in the prior art clutch 90 as depicted by the curve portions 131, 141 in Fig. 6. Because there is substantially no residual torque with the improved arrangement here described, except the inherent shearing torque arising from the presence of an oil film between the several laminations, the rapidly decaying torque of a clutch which has just been deenergized reaches zero before the rising torque of an energized clutch reaches an appreciable value. This further assures that the two clutches do not work in opposition and "lock up" the drive when a transition is made. The curve portions 186 and 185 in Fig. 9 illustrate this. Finally, the reduction of residual flux and torque provided by the auxiliary, non-magnetic laminations 210, 210a reduces the drag of a deenergized clutch and thus largely eliminates a useless, inefficient load on the driving motor which is otherwise present in the prior art arrangement.

In summary, it may be observed that the magnetic clutch construction and control arrangement here described provides faster and more reliable operation permitting positioning of a machine tool component with greater accuracy. Three things mutually cooperate and contribute to produce this improvement. First, the two clutch coils are both normally energized so that it is only necessary to deenergize one to quickly release it and place the other in driving operation whenever a column is to be started. Secondly, capacitors in parallel with the clutch coils are employed to create an oscillatory although critically damped discharge circuit which causes very rapid decay of clutch coil current flux and torque whenever a given clutch is deenergized. This not only results in quicker starting of the drive but substantially eliminates the possibility of lock-up when drive is switched from one clutch to the other. Thirdly, a low permeability auxiliary lamination is included in the flux path of each clutch to reduce the residual flux and the resulting residual torque when the coil of that clutch is deenergized, thereby further reducing the chances of lock-up and eliminating an inefficient drag which would otherwise be present.

We claim:

1. In apparatus for positioning a movable component of a machine tool, the combination comprising first and second electromagnetic clutches, each having a high permeability body and a coil embedded therein, a high permeability armature axially movable and rotatable relative to the body, a stack of interleaved high permeability laminations alternate ones of which are non-rotatably fixed to the body and the armature, respectively, and a low permeability lamination included in said stack; a prime mover; a plural speed gear transmission driven by said prime mover and connected to translate the machine tool element; means connecting said two clutches in said transmission such that when the first alone is engaged, the element is translated at rapid traverse rate and when the second alone is engaged, the element is translated at a feed rate; a capacitor connected in parallel with the coil of each of said clutches to create an oscillatory discharge circuit; control means for normally deenergizing said prime mover and normally energizing the coils of both said first and second clutches with direct current thereby locking the laminations thereof; and control means for optionally deenergizing the coil of either the first or the second clutch while energizing said prime mover to thereby effect feed or rapid traverse of the machine tool element.

2. In apparatus for positioning a movable component of a machine tool, the combination comprising an electric motor, a two speed gear transmission driven by said motor and connected to translate the machine tool element, first and second electromagnetic clutches operatively included in said transmission to effect rapid traverse and feed of the element when they are respectively engaged; each of said clutches having an annular body of high permeability material with a coil embedded therein, an annular armature of high permeability material axially movable and rotatable relative to said body, a stack of annular high permeability spring laminations alternate ones of which are non-rotatably fixed to the body and the armature respectively so that after energization of the coil the armature is attracted towards the body to compress and lock the laminations, and an additional lamination of low permeability material included in said stack; a capacitor connected in parallel with the coil of each of said clutches to form an oscillatory discharge circuit; control means for normally deenergizing said motor and normally energizing with direct current the coils of both said clutches, control means for deenergizing the coil of the first clutch and energizing said motor to produce feed translation of the machine tool component, and control means for deenergizing the coil of said second clutch and energizing said motor to produce rapid traverse translation of the machine tool component.

3. In apparatus for positioning a movable element of a machine tool, the combination comprising a prime mover, a plural speed transmission driven by said prime mover and connected to translate the machine tool element, said transmission including first and second electromagnetic clutches each having a coil and operative when engaged to translate the machine tool element at rapid traverse and feed rates, respectively, a capacitor connected in parallel with the coil of each of said clutches to form an oscillatory discharge circuit, means for normally energizing with direct current both of the clutch coils, means for deenergizing the first clutch coil and energizing said prime mover to produce translation of the element at feed rate, and means for deenergizing the second clutch coil and energizing said prime mover to produce translation of the element at rapid traverse rate.

4. In apparatus for positioning a movable element of a machine tool, the combination comprising a prime mover, a plural speed transmission driven by said prime mover and connected to translate the machine tool element, said transmission including first and second electromagnetic clutches each having a coil and operative when engaged to translate the machine tool element at rapid traverse and feed rates, respectively, means for normally energizing both of the clutch coils, means for deenergizing the first clutch coil and energizing said prime mover to produce translation of the element at feed rate, and means for deenergizing the second clutch coil and energizing said prime mover to produce translation of the element at rapid traverse rate.

5. In apparatus for positioning a movable element of a machine tool, the combination comprising an electric motor, a two-speed gear transmission driven by said motor and connected to translate the machine tool element, said transmission including first and second electromagnetic clutches each having a body containing a coil together with an armature rotatable relative to the housing and interleaved laminations connected to the housing and armature for locking the two when the coil is energized, means connecting said first and second clutches in said transmission for translating the machine tool element at rapid traverse and feed rates, respectively, when said first and second clutches are individually engaged, control means for normally energizing both of said clutches and normally deenergizing said motor, and control means for energizing said motor while deenergizing optionally either the second clutch coil of the first clutch coil to cause translation of the machine tool element at rapid traverse or feed rates, respectively.

6. In apparatus for positioning a movable element of a machine tool, the combination comprising an electric motor, a two-speed gear transmission driven by said motor and connected to translate the machine tool element, said transmission including first and second electromagnetic clutches each having a body containing a coil together with an armature rotatable relative to the housing and interleaved laminations connected to the housing and armature for locking the two when the coil is energized, means connecting said first and second clutches in said transmission for translating the machine tool element at rapid traverse and feed rates, respectively, when said first and second clutches are individually engaged, a multiple position push button switch, means responsive to said push button switch when the latter is released for normally energizing both of said clutches and normally deenergizing said motor, means responsive to depression of said switch to a first position for energizing said motor and deenergizing the first clutch coil, and means responsive to depression of said switch to a second position for energizing said motor and deenergizing the second clutch coil.

7. In apparatus for positioning a movable component of a machine tool, the combination comprising first and second electromagnetic clutches, each having a high permeability body and a coil embedded therein, a high permeability armature axially movable and rotatable relative to the body, a stack of interleaved high permeability laminations alternate ones of which are non-rotatably fixed to the body and the armature, respectively, and a low permeability lamination included in said stack; a prime mover; a plural speed gear transmission driven by said prime mover and connected to translate the machine tool element; means connecting said two clutches in said transmission such that when the first alone is engaged the element is translated at rapid traverse rate and when the second alone is engaged, the element is translated at a feed rate; control means for normally deenergizing said prime mover and normally energizing the coils of both said first and second clutches thereby locking the laminations thereof; and control means for optionally deenergizing the coil of either the first or the second clutch while energizing said prime mover to thereby effect feed or rapid traverse of the machine tool element.

8. In apparatus for positioning a movable component of a machine tool, the combination comprising an electric motor, a two-speed gear transmission driven by said motor and connected to translate the machine tool element, first and second electromagnetic clutches operatively included in said transmission to effect rapid traverse and feed of the element when they are respectively engaged; each of said clutches having an annular body of high permeability material with a coil embedded therein, an annular armature of high permeability material axially movable and rotatable relative to said body, a stack of annular high permeability spring laminations alternate ones of which are non-rotatably fixed to the body and the armature so that after energization of the coil the armature is attracted towards the body to compress and lock the laminations, and an additional lamination of low permeability material included in said stack; control means for normally deenergizing said motor and normally energizing the coils of both said clutches, control means for deenergizing the coil of the first clutch and energizing said motor to produce feed translation of the machine tool component, and control means for deenergizing the coil of said second clutch and energizing said motor to produce rapid traverse translation of the machine tool component.

9. In a two-speed gear transmission connected between a motor and a load for driving the latter from the former, the combination of two electromagnetic clutches each having a coil and a stack of high permeability laminations through which magnetic flux passes when the coil is energized, a low permeability shim included in each of said stacks, means connecting said clutches in the transmission for drive alternately therethrough to produce different speed change ratios, means normally energizing the coils of both of said clutches, and means for deenergizing the coil of one clutch when drive is to be taken through the other clutch.

References Cited in the file of this patent

FOREIGN PATENTS 841,016   Germany _______________ June 9, 1952